(12) United States Patent
Takanashi et al.

(10) Patent No.: US 6,308,431 B1
(45) Date of Patent: Oct. 30, 2001

(54) AIR CHUCK WITH MEASURING FUNCTION

(75) Inventors: Seiji Takanashi; Katsumi Hagiwara; Kouichirou Kanda, all of Ibaraki (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/556,967

(22) Filed: Apr. 24, 2000

(30) Foreign Application Priority Data

Jul. 1, 1999 (JP) .................................................. 11-187941

(51) Int. Cl.$^7$ ...................................................... G01B 5/00
(52) U.S. Cl. .................. 33/708; 33/706; 33/783; 33/811; 33/DIG. 2
(58) Field of Search ............................ 33/708, 706, 783, 33/784, 792, 793, 794, 795, 802, 810, 811, DIG. 2

(56) References Cited

U.S. PATENT DOCUMENTS

| 4,484,391 | * | 11/1984 | Narimatsu | 33/706 |
| 4,700,483 | * | 10/1987 | Tsujiuchi et al. | 33/706 |
| 5,016,359 | * | 5/1991 | Nagaoka et al. | 33/702 |
| 5,163,729 | | 11/1992 | Borcea et al. | 294/88 |
| 5,620,223 | | 4/1997 | Mills | 294/88 |
| 6,092,296 | * | 7/2000 | Nelle | 33/706 |
| 6,145,214 | * | 11/2000 | Shimano et al. | 33/706 |

FOREIGN PATENT DOCUMENTS

| 3825182-A1 | * | 4/1986 | (DE) . |
| 3904365-A1 | * | 7/1989 | (DE) . |
| 43 06 634 | | 9/1993 | (DE) . |
| 43 44 290 | | 6/1994 | (DE) . |
| 198 01 091 | | 8/1998 | (DE) . |
| 0368777-A1 | * | 5/1990 | (FR) . |
| 3023095 | | 1/1996 | (JP) . |

* cited by examiner

Primary Examiner—Andrew H. Hirshfeld
Assistant Examiner—Yaritza Guadalupe
(74) Attorney, Agent, or Firm—Oblon, Spivak, McClelland, Maier & Neustadt, P.C.

(57) ABSTRACT

A pair of jaw components 7a and 7b positioned on both sides of a casing 1 are attached to both the tips of a pair of parallel piston rods 6a and 6b which synchronously extend and contract in opposite directions by an action of an air pressure and the tips of a pair of guide rods 13a and 13b which synchronously extend and contract in opposite directions by a rack-and-pinion mechanism. By forming a magnetic scale 18 on a side face of one of the guide rods, 13b, the guide rod 13a is also used as a part of a dimension measuring mechanism. A sensor unit 20 for reading the magnetic scale 18 is attached to the casing 1.

4 Claims, 6 Drawing Sheets

AIR CHUCK WITH MEASURING FUNCTION

FIELD OF THE INVENTION

The present invention relates to an air chuck for gripping a workpiece by a plurality of jaw components which are opened and closed by the action of an air pressure. More specifically, the invention relates to an air chuck with a measuring function capable of measuring the dimension, shape, and the like of a workpiece gripped.

PRIOR ART

An air chuck for gripping a workpiece by a plurality of jaw components which are opened and closed by the action of an air pressure is conventionally well known. For example, Japanese Registered Utility Model Publication No. 3023059 discloses an air chuck of this kind in which a pair of parallel piston rods which extend/contract synchronously with each other in the opposite directions by the action of an air pressure are provided in a casing having a rectangular parallelepiped shape, a jaw component is attached to the tip of each of the piston rods protruding from end faces of the opposite sides of the casing, and a workpiece is gripped by the pair of jaw components which are opened and closed according to the extension/contraction of the piston rods. In the air chuck, for a smooth opening/closing operation of the jaw components, a pair of guide rods which synchronously extend and contract in the opposite directions by a rack-and-pinion mechanism are mounted in the casing, the tips of the guide rods are connected to the jaw components, and the opening/closing operation of the jaw components is guided by the guide rods.

Since the interval between the jaw components, the opening/closing stroke, and the like are set to relatively large values, the air chuck has an advantage such that workpieces having different dimensions can be certainly gripped. Although the air chuck can grip workpieces of various dimensions, the air chuck cannot recognize the dimension of a workpiece gripped. Consequently, the air chuck cannot select workpieces of different dimensions by its dimension and cannot center the workpiece.

If an opening/closing stroke of the jaw components is measured by an electric or magnetic means, the dimension of a workpiece can be measured. When dedicated measuring means is assembled, however, the structure of the chuck is complicated and the size is also enlarged.

DISCLOSURE OF THE INVENTION

A technical subject of the invention is to provide an air chuck having a simple, rational design structure capable of measuring the dimension of a workpiece gripped.

In order to achieve the above subject, according to the invention, there is provided an air chuck comprising: a casing having therein a pair of cylindrical holes and a pair of guide holes; pistons slidably housed in the above cylindrical holes and synchronously driven in opposite directions; a pair of piston rods which are integrally connected to the pistons and whose tips are protruded in opposite directions from both end faces of the casing; a pair of guide rods which are slidably inserted in the guide holes and whose tips are protruded in opposite directions from both end faces of the casing; racks formed in the above guide rods; a pinion which meshes with each of the racks; a pair of jaw components commonly attached to the tips of the piston rods and the tips of the guide rods on both end faces of the casing; a magnetic scale which is formed on a side face of one of the guide rods; and a sensor unit for reading the magnetic scale.

The air chuck of the invention having the above construction can measure the dimension of a workpiece gripped by the pair of jaw components by reading the magnetic scale on the guide rod which slides together with the jaw components by a sensor unit. By gripping a workpiece at a plurality of sites to measure the dimensions at the gripped positions, the shape of the workpiece can also be determined.

When the air chuck is provided with the dimension measuring mechanism, by providing the magnetic scale on the guide rod as guiding means for making the opening/closing operation of the jaw components smooth, the guide rod is used as a part of the dimension measuring mechanism, so that it is unnecessary to separately provide a rod dedicated to the magnetic scale. Consequently, the air chuck with the dimension measuring mechanism can have a very simple and rational design structure. Moreover, the air chuck is prevented from being enlarged by attaching the dimension measuring mechanism.

According to an embodiment of the invention, the casing has a substantially rectangular parallelepiped shape, the pair of guide rods and the pair of pistons and piston rods are arranged in upper and lower stage in the casing, the top face of the casing serves as an attaching face to be attached to a robot arm, and the sensor unit is attached in a position corresponding to the guide rod with the magnetic scale on the side face of the casing, at a height at which the sensor unit is not protruded upward from the top face of the casing.

Consequently, the dimension measuring mechanism can be easily assembled in the air chuck without largely modifying a known air chuck and without causing a problem such that the sensor unit becomes an obstruction when the air chuck is attached to a robot arm.

According to another embodiment of the invention, the sensor unit comprises: a read head having a sensor for reading the magnetic scale in a sensor case; and an amplifying unit having an amplifying circuit for amplifying a read signal from the read head in an amplification case. The above read head is fixed in a head attaching hole formed in the casing, and the amplifying unit is fixed in the casing in order to cover the whole read head with the amplification case in a state where a waterproof seal is interposed between the amplification case and the casing.

By attaching the sensor unit to the casing in such a mode, the read head is completely protected from moisture by the amplification case and the waterproof seal. Consequently, even when the air chuck is used in a high-moisture environment, it is prevented that moisture enters the read head and exerts an adverse influence on measurement. Thus, high measurement accuracy can be maintained.

DETAILED DESCRIPTION

Figure 1:
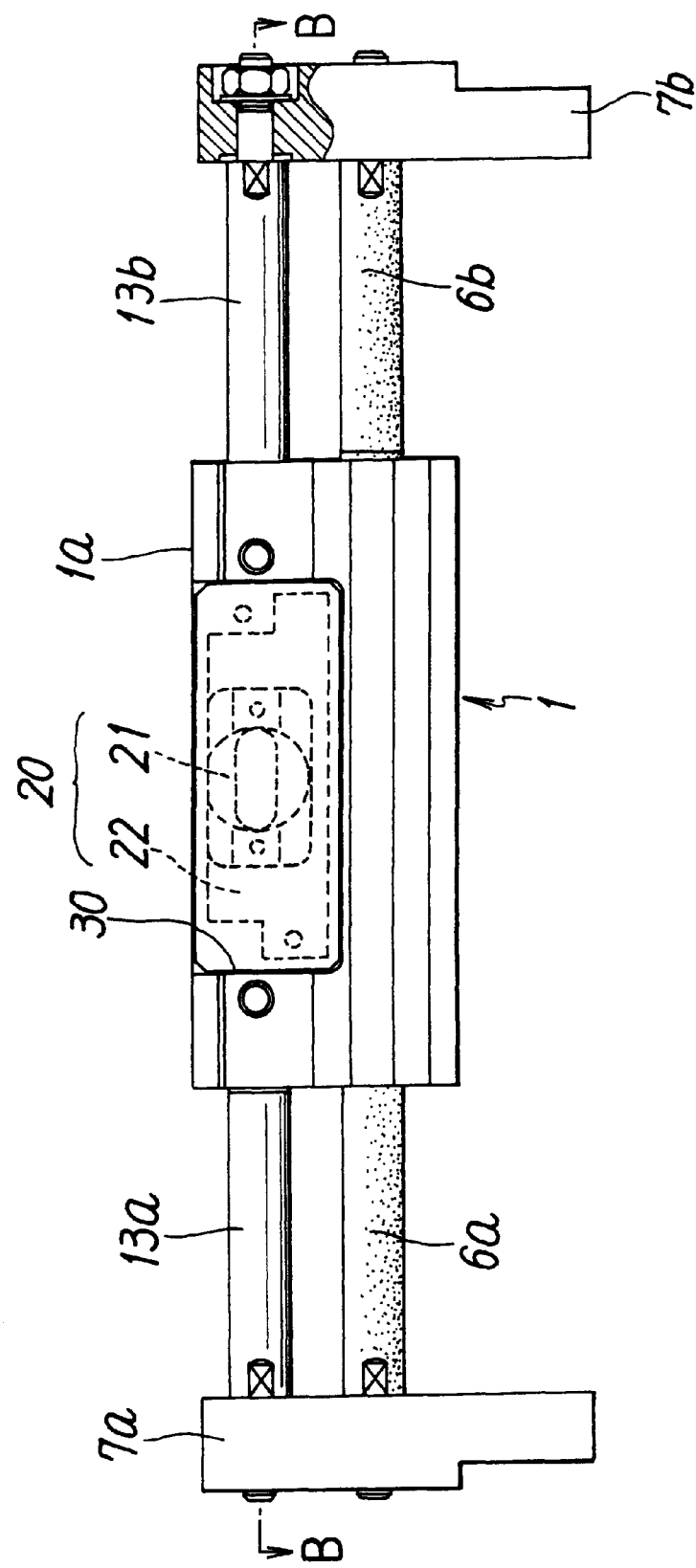
FIG. 1 is a front view showing a preferred embodiment of an air chuck according to the invention.
Figure 2:
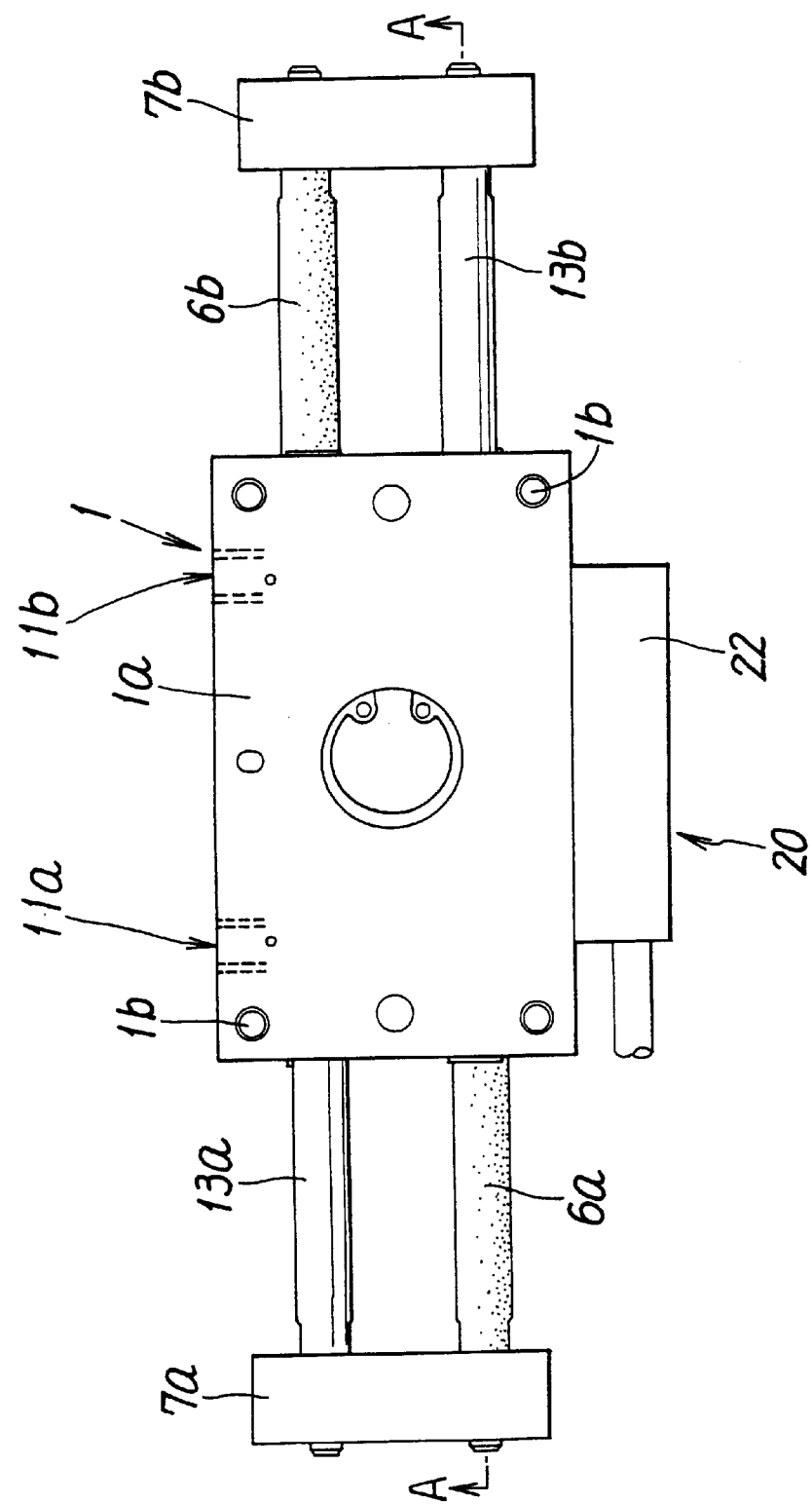
FIG. 2 is a plan view of the air chuck of FIG. 1.
Figure 3:
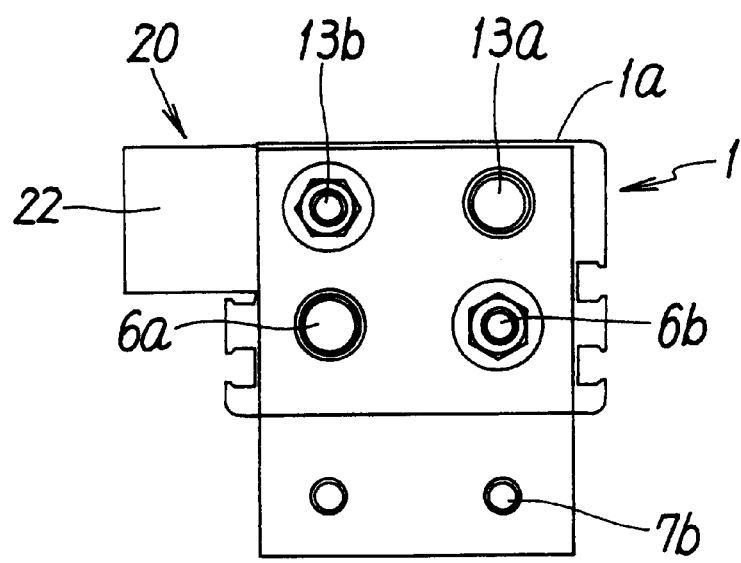
FIG. 3 is a side view of the air chuck of FIG. 1.
Figure 4:
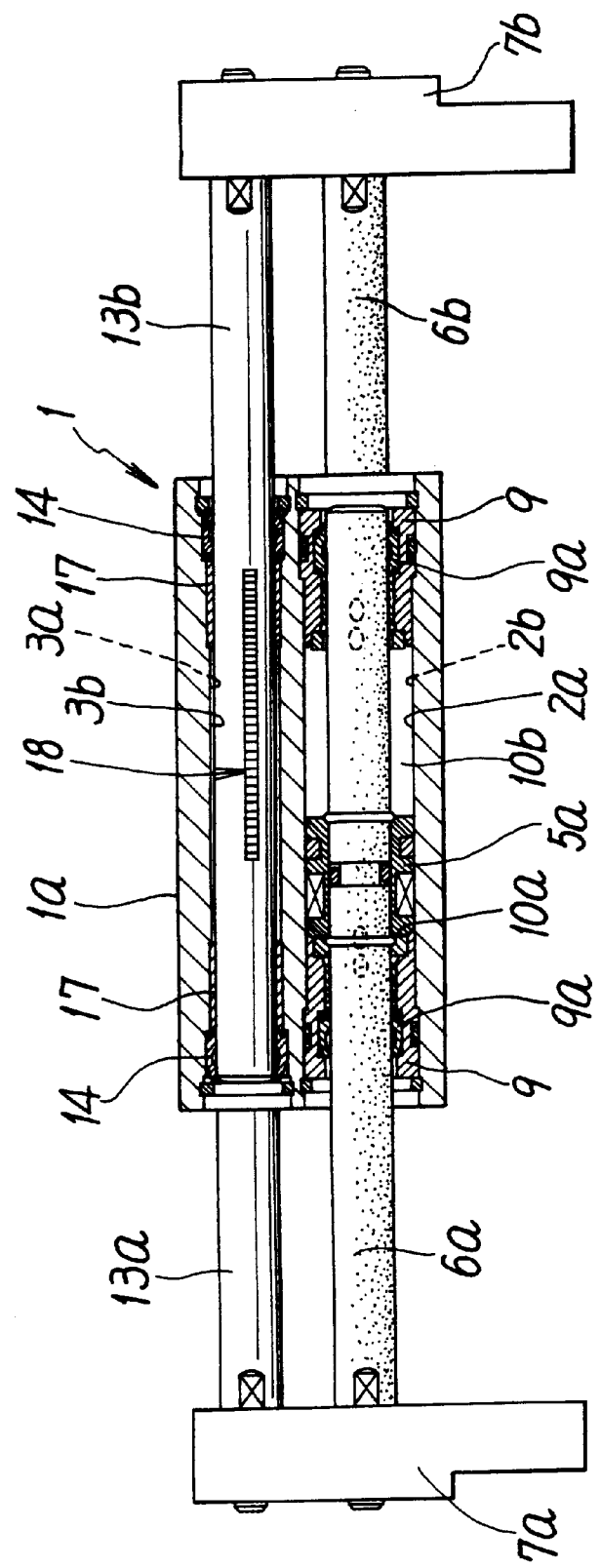
FIG. 4 is a cross section taken along line A—A of FIG. 2.
Figure 5:
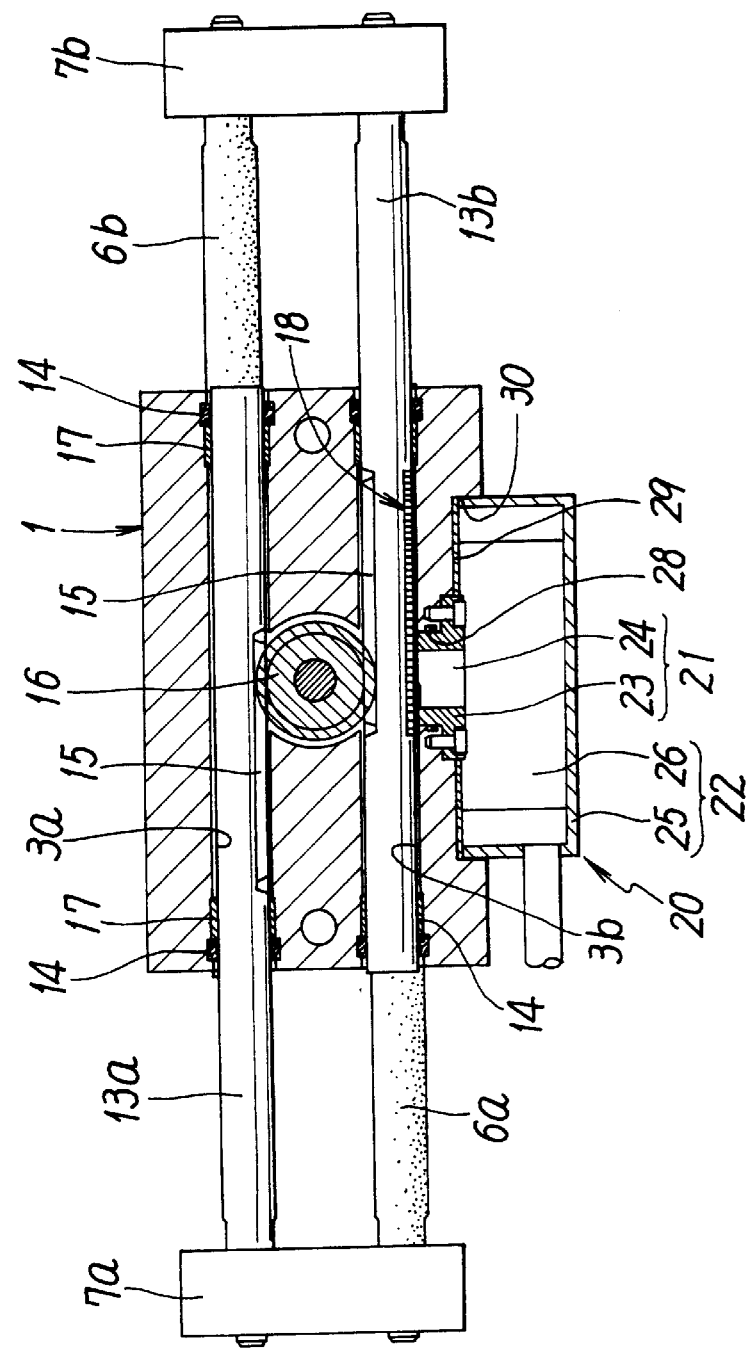
FIG. 5 is a cross section taken along line B—B of FIG. 1.

A preferred typical embodiment of an air chuck according to the invention will be described in detail hereinbelow with reference to the drawings. As shown in FIGS. 1 to 5, the air chuck has a casing 1 having a substantially rectangular parallelepiped shape. The top face of the casing 1 serves as an attaching face 1a which is substantially flat for attaching to a robot arm, and screw holes 1b for attachment are opened at the four corners of the attaching face. In the casing 1, a pair of right and left cylindrical holes 2a and 2b which extend in parallel with each other are provided in the lower stage of the casing 1 and a pair of right and left guide holes 3a and 3b are provided in the upper stage.

Pistons 5a and 5b (5b not shown) are slidably housed in the cylindrical holes 2a and 2b, respectively. Piston rods 6a and 6b integrally connected to each of the pistons 5a and 5b are provided so that their tips are projected from the opposite end faces of the casing 1 through the cylindrical holes 2a and 2b. Jaw components 7a and 7b for gripping a workpiece are individually attached to the tips of the piston rods 6a and 6b, respectively.

A first pressure action chamber 10a on the tip side of the piston rods 6a and 6b and a second pressure action chamber 10b on the proximal side of the piston rods 6a and 6b are formed between the pistons 5a and 5b in the cylindrical holes 2a and 2b and sealing members 9 and 9 attached to both ends of the cylindrical holes 2a and 2b, respectively. The first pressure action chambers 10a and 10a in the two cylindrical holes 2a and 2b commonly communicate with a first port 11a which is opened on a side face of the casing 1 and the second pressure action chambers 10b and 10b commonly communicate with a second port 11b. The piston rods 6a and 6b slidably penetrate the sealing members 9 via waterproof sealing members 9a.

When compressed air is supplied from the second port 11b to the second pressure action chambers 10b and 10b of the two cylindrical holes 2a and 2b, as shown in the diagrams, the two pistons 5a and 5b slide in the opposite directions toward the first pressure action chambers 10a and 10a. Consequently, the two piston rods 6a and 6b move forward (extend) and the interval between the pair of jaw components 7a and 7b is widened. On the contrary, when compressed air is supplied from the first port 11a to the first pressure action chambers 10a and 10a, the two pistons 5a and 5b slide in opposite directions toward the second pressure action chambers 10b and 10b, respectively, the two piston rods 6a and 6b move backward (contract) and the interval between the pair of jaw components 7a and 7b is narrowed. Consequently, a workpiece can be sandwiched between the jaw components 7a and 7b. In this case, attachments suited to a workpiece are mounted to the jaw components 7a and 7b and the workpiece is gripped by the attachments. Guide rods 13a and 13b which compose a guiding means for making the opening and closing operation of the jaw components 7a and 7b smooth are slidably inserted to the two guide holes 3a and 3b, respectively, in a state where the tips of the guide rods 13a and 13b are projected from opposite ends of the casing 1. The tips of the guide rods 13a and 13b are connected to the jaw components 7a and 7b. Both ends of the guide holes 3a and 3b is provided with a dust seal 14 which is hermetically slidably attached around each of the guide rods 13a and 13b and a bearing member 17,respectively. The dust seal 14 prevents moisture and other foreign matters from entering the guide holes 3a and 3b.

In an intermediate portion of each of the two guide rods 13a and 13b, racks 15 are partly provided. The racks 15 and 15 mesh with a common pinion 16 rotatably provided in a position between the two guide rods 13a and 13b in the casing 1. By the rack-and-pinion mechanism, the two guide rods 13a and 13b synchronously slide in opposite directions. By being guided by the guide rods 13a and 13b, the two jaw components 7a and 7b can be smoothly opened and closed.

On a side face of the guide rod 13b as one of the two guide rods 13a and 13b, a magnetic scale 18 formed by alternately disposing magnetic portions and non-magnetic portions at a predetermined pitch (for example, 0.8 mm pitch) is partially attached in the axial direction of the rod. On a side face of the casing 1, a sensor unit 20 for reading the magnetic scale 18 is attached.

The sensor unit 20 comprises a read head 21 and an amplifying unit 22. The read head 21 is constructed by mounting a sensor 24 for reading the magnetic scale 18 in a sensor casing 23. A magnetoresistance element of whose electric resistance value changes according to a magnetic force can be suitably used as the sensor 24. On the other hand, the amplifying unit 22 incorporates a signal processing circuit 26 including an amplifying circuit for amplifying a read signal from the read head 21 and a dividing circuit for dividing the amplified signal in an amplification case 25 having an angular cap shape. The read head 21 and the amplifying unit 22 are connected to each other via a lead wire (not shown).

The sensor unit 20 is attached to a side face of the casing 1 in the following manner. In a head attaching hole 28 opened on the side face of the casing 1, the read head 21 is fixed so that the sensor 24 is positioned close to the magnetic scale 18 of the guide rod 13a. The whole read head 21 is completely covered with the amplification case 25 of the amplifying unit 22. In a state where a waterproof seal 29 is interposed between the casing 1 and the periphery of the read head 21, the sensor unit 20 is fit in a step 30 formed in the side face of the casing 1 and is fixed to the casing 1 by proper means such as screwing. By attaching the sensor unit 20 to the casing 1 as mentioned above, the read head 21 can be completely protected from moisture by the amplification case 25 and the waterproof seal 29. Consequently, even when the air chuck is used in a high-moisture environment, it is prevented that moisture enters the read head 21 and exerts an adverse influence on measurement. Thus, high measurement accuracy can be maintained.

The sensor unit 20 is attached at a height at which the sensor unit 20 is not protruded from the top face of the casing, which is a attaching face 1a to the robot arm. It prevents occurrence of a problem such that unit 20 disturbs attachment of the air chuck to a robot arm.

Figure 6:
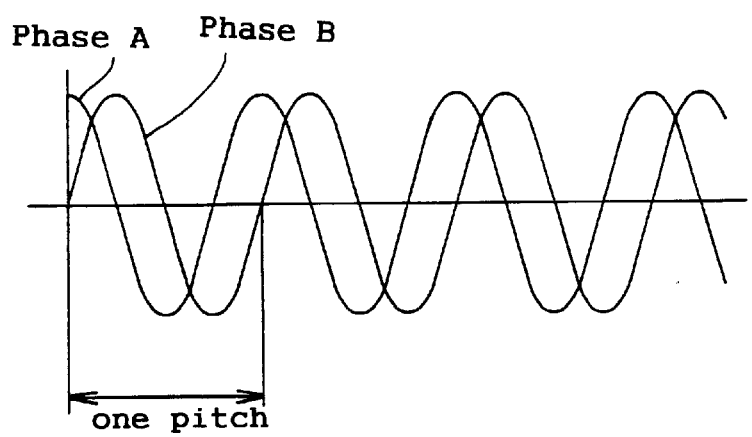
FIG. 6 is a waveform chart of a two-phase signal outputted from a read head.

The sensor unit 20 reads a motion stroke of the guide rod 13b (that is, opening/closing stroke of the jaw components 7a and 7b from the magnetic scale 18 and outputs it as a pulse signal. Specifically, when the two jaw components 7a and 7b are opened/closed and the guide rod 13b with the magnetic scale 18 is moved, the read head 21 reads the magnetic scale 18 and outputs a two-phase signal of an A phase and a B phase having sin and cos waveforms as shown in FIG. 6. The waveforms of one period correspond to one pitch of the magnetic scale 18.

Figure 7:
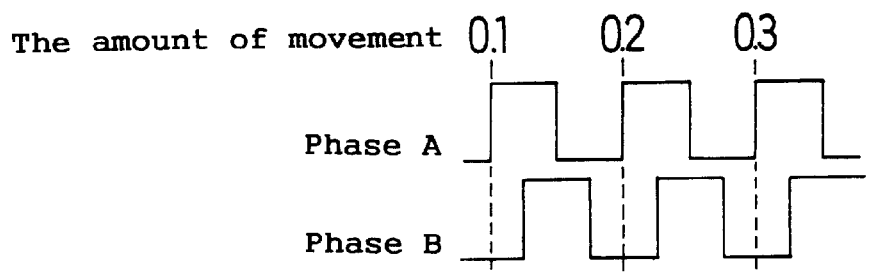
FIG. 7 is a waveform chart of a pulse signal outputted from an amplifying unit.

The signal is amplified by the amplifying unit 22 and is divided into a plurality of pulses. A pulse signal as shown in FIG. 7 is outputted from the amplifying unit 22 to a controller (not shown). By counting the pulses by a counter, the position of the guide rod 13b (that is, the positions of the jaw components 7a and 7b can be detected and the dimension of the workpiece gripped by the two jaw components 7a and 7b can be measured by this position.

For example, in the case where the magnetic scale 18 is calibrated at a 0.8 mm pitch, when a signal from the read head 21 is amplified and is divided into ⅛, a pulse signal having a phase difference of 90 degrees of 0.1 mm/pulse is outputted. Consequently, the dimension of the workpiece can be measured with a resolution of 0.1 mm. When the signal is divided into ¹⁄₂₀, the dimension of the workpiece can be measured with high resolution of 0.04 mm.

As described above, the air chuck can measure the dimension of a workpiece gripped by the pair of jaw components by reading the magnetic scale on the guide rod which slides together with the jaw components by the sensor unit.

When the dimension measuring mechanism is assembled in the air chuck, by providing the guide rod as guiding means for making the opening/closing operation of the jaw components smooth with the magnetic scale, the guide rod is used as a part of the dimension measuring mechanism, so that a rod dedicated for a magnetic scale does not have to be provided. Consequently, the air chuck with the dimension measuring mechanism can have a very simple and rational design structure. Moreover, the size of the air chuck can be prevented from being enlarged by attaching the dimension measuring mechanism.

What is claimed is:

1. An air chuck with a measuring function, comprising: a casing having therein a pair of cylindrical holes and a pair of guide holes which extend in parallel with each other;

pistons slidably housed in the pair of cylindrical holes and synchronously driven in opposite directions by an action of air pressure;

a pair of piston rods which are integrally connected to the pistons and whose tips are protruded in opposite directions from both end faces of the casing;

a pair of guide rods which are slidably inserted in the guide holes and whose tips are protruded in opposite directions from both end faces of the casing;

racks formed in the pair of guide rods;

a pinion which is rotatably mounted in a position between the pair of guide rods in the casing and which meshes with each of the racks;

a pair of jaw components for gripping a workpiece, commonly attached to the tips of the piston rods and the tips of the guide rods on both sides of the casing;

a magnetic scale which is formed along the axial line of the guide rods on a side face of one of the guide rod and is composed by a plurality of magnetic portions and non-magnetic portions which are arranged alternately; and a sensor unit for reading the magnetic scale, attached to the casing.

2. The air chuck according to claim 1, wherein the a casing has a substantially rectangular parallelepiped shape, the pair of guide rods and the pair of piston rods are arranged in upper and lower stages in the casing, the top face of the casing serves as an attaching face to be attached to a robot arm, and the sensor unit is attached in a position corresponding to the guide rod with the magnetic scale on the side face of the casing, at a height at which the sensor unit is not protruded upward from the top face of the casing.

3. The air chuck according to claim 2, wherein the sensor unit comprises: a read head having a sensor for reading the magnetic scale in a sensor case; and an amplifying unit having an amplifying circuit for amplifying a read signal from the read head in an amplification case, the read head is fixed in a head attaching hole opened in a side face of the casing so as to communicate with the guide hole in a state where the sensor is positioned close to the magnetic scale on the guide rod, and the amplifying unit is fixed in a step formed around the head attaching hole on the side face of the casing in a state where the whole read head is covered with an amplification case and a waterproof seal is interposed between the amplification case and the casing.

4. The air chuck according to claim 1, wherein the sensor unit comprises: a read head having a sensor for reading the magnetic scale in a sensor case; and an amplifying unit having an amplifying circuit for amplifying a read signal from the read head in an amplification case, the read head is fixed in a head attaching hole opened in a side face of the casing so as to communicate with the guide hole in a state where the sensor is positioned close to the magnetic scale on the guide rod, and the amplifying unit is fixed in a recessed step formed around the head attaching hole on the side face of the casing in a state where the whole read head is covered with an amplification case and a waterproof seal is interposed between the amplification case and the casing.

\* \* \* \* \*